(12) United States Patent
Wilke et al.

(10) Patent No.: US 10,119,239 B2
(45) Date of Patent: Nov. 6, 2018

(54) METHOD FOR SETTING UP A PROTECTIVE SEALING LAYER IN A LANDFILL BASIN FOR INDUSTRIAL AND MINING SLURRIES AND GEOTEXTILE PROTECTIVE TUBE MAT FOR CARRYING OUT THE METHOD

(71) Applicant: HUESKER SYNTHETIC GMBH, Gescher (DE)

(72) Inventors: Markus Wilke, Coesfeld (DE); Morné Breytenbach, Yaroomba (AU)

(73) Assignee: HUESKER SYNTHETIC GmbH, Gescher (DE)

( * ) Notice: Subject to any disclaimer, the term of this patent is extended or adjusted under 35 U.S.C. 154(b) by 0 days.

(21) Appl. No.: 15/744,361

(22) PCT Filed: Jul. 20, 2016

(86) PCT No.: PCT/DE2016/100328
§ 371 (c)(1),
(2) Date: Jan. 12, 2018

(87) PCT Pub. No.: WO2017/012612
PCT Pub. Date: Jan. 26, 2017

(65) Prior Publication Data
US 2018/0202124 A1  Jul. 19, 2018

(30) Foreign Application Priority Data

Jul. 20, 2015 (DE) ........................ 10 2015 111 761

(51) Int. Cl.
| E02D 31/00 | (2006.01) |
| B32B 1/08 | (2006.01) |
| B32B 5/26 | (2006.01) |

(52) U.S. Cl.
CPC .............. *E02D 31/004* (2013.01); *B32B 1/08* (2013.01); *B32B 5/26* (2013.01); *B32B 2262/0253* (2013.01); *B32B 2307/71* (2013.01)

(58) Field of Classification Search
CPC . E02D 31/004; E02D 2300/0087; B32B 5/26; B32B 1/08; B32B 2262/0253; B32B 2307/71
See application file for complete search history.

(56) References Cited

FOREIGN PATENT DOCUMENTS

| DE | 3812253 A1 | 10/1989 |
| DE | 4336940 A1 | 5/1994 |

OTHER PUBLICATIONS

International Search Report of Corresponding International Application No. PCT/DE2016/100328, filed Jul. 20, 2016.

*Primary Examiner* — Carib A Oquendo
(74) *Attorney, Agent, or Firm* — Robert W. Morris; Ojeiku Aisiku; Eckert Seamans Cherin & Mellott, LLC (57) ABSTRACT

A method and geotextile protective tube mat for setting up a protective sealing layer in a landfill basin for industrial and mining slurries, wherein the landfill basin comprises at least a bottom area and an embankment ring, which are covered at least up to the height of a maximum filling level with a single-ply or multi-ply base sealing layer. The method includes the steps of: providing and using bottom protective tube mats (10), consisting of a water-permeable, multi-ply geotextile fabric, in which at least a lower ply (17) and an upper ply (18) are connected directly to one another along a number of parallel connecting lines (11; 15), wherein flexible tubes (12) are formed between neighboring connecting lines (11; 15) that are separate from one another and each have at least one filling opening (13); laying out the bottom protective tube mats (10) on the bottom area of the landfill basin; laying out embankment protective tube mats (10) on the embankment ring, wherein the flexible tubes (12) are (Continued)

aligned in the direction of the slope of the embankment or at an acute angle thereto; and filling each flexible tube (12) individually with an aqueous suspension and sealing the filling openings (13).

11 Claims, 5 Drawing Sheets

METHOD FOR SETTING UP A PROTECTIVE SEALING LAYER IN A LANDFILL BASIN FOR INDUSTRIAL AND MINING SLURRIES AND GEOTEXTILE PROTECTIVE TUBE MAT FOR CARRYING OUT THE METHOD

BACKGROUND OF THE INVENTION

The invention relates to a method for setting up a protective sealing layer in a landfill basin for industrial and mining slurries and a geotextile protective tube mat for carrying out the method.

Slurry-like waste occurs in industrial processes, in particular in the mining industry. In the mining industry, these are, in particular, residues from the treatment of ores, which are present in the form of slurries and are referred to as tailing. These slurries are collected in so-called slurry ponds and stored permanently, whereby an absolute tightness of a sealing layer covering the bottom is required and this over a very long period, since it is usually a repository for the waste, thus remaining permanently in the slurry ponds. The production of a completely tight and against the substances contained in the slurries chemically resistant sealing level is basically possible according to the prior art. However, the bottom sealing layer, usually consisting of a plastic sealing strip with additional layers is endangered by the effects of heat and UV radiation as well as due to mechanical damage.

The mechanical damage can result from driving and walking on the sealing level. The application of a protection layer against UV and heat made of sand, soil or mixtures containing concrete is possible, but requires large machinery considering the large dimensions of the slurry ponds and the enclosing embankments to transport and distribute the material. The bottom sealing layer is often damaged by driving on the embankments, so that leaks can occur even with the use of multi-layer sealing strips, resulting in a significant environmental hazard.

To improve the leak tightness, it is also known to incorporate so-called GCL mats (Geosynthetic Clay Liner) containing a bentonite mixture that swells under the action of water to form a tight layer. However, this would require providing a uniform surface pressure on the mat filled with bentonite, otherwise there is locally different swelling and a tearing apart of the bentonite layer.

SUMMARY OF THE INVENTION

The objective of the present invention is, therefore, to provide a method for setting up a protective sealing layer in a landfill basin for industrial and mining slurries by which the actual sealing level is protected against heat, UV radiation and mechanical damage.

The use of a protective tube mat made of a water-permeable geotextile fabric leads to a significant reduction in weight for transport, compared to the moving of large quantities of sand or concrete for covering the sealing layer. The geotextile protective tube mats can be delivered rolled up and are then placed on the floor of the landfill basin as well as on the embankments. It is not necessary to drive on the sealing strips with heavy equipment during the installation so that mechanical damage of the sealing tracks is prevented. Furthermore, the geotextile from which the protective tube mats are formed, are optically so tight that there is already, a substantial protection against UV radiation for the underlying sealing strips in the unfilled state. The geotextile protective tube mats can thus be placed at an early stage and can subsequently be aligned in their position to each other, with a good UV protection for the sealing straps being already provided without filling.

After the final positioning of the protective tube mats, the tubes formed therein are then individually filled with an aqueous suspension. For this purpose, parallel connecting lines are present on the protective tube mats, at which a lower and upper layer of the fabric are connected to each other, in particular interwoven, with flexible tubes being formed between the respective connecting lines.

This objective, as well as other objectives which will occur to those skilled in the art, are achieved, according to the present invention, by a method comprising the steps of:

a) providing and using bottom protective tube mats consisting of a water-permeable, multi-layered geotextile fabric in which at least one lower layer and one upper layer are directly connected to one another along a plurality of parallel connecting lines wherein separate flexible tubes are formed between adjacent connecting lines, each having at least one filling opening;

b) laying out the bottom protective tube mats on the bottom area of the landfill basin;

c) laying out embankment protective tube mats on the embankment ring, wherein the flexible tubes are aligned in the direction of the slope of the embankment, or at an acute angle thereto; and d) filling each flexible tube individually with an aqueous suspension and closing the filling openings.

These flexible tubes are separated from each other, that is, the layers are so closely connected that water, but no slurry can flow into an adjacent flexible tube. Each flexible tube is also individually closed at its end, e.g., by sewing together the two layers. The end of the flexible tube can initially remain open and serve as a filling opening. It is also possible to introduce a separate filling opening on the upwardly facing layer of the protective tube mat.

The flexible tube is then filled via the filling opening, so that a rib-shaped structure is formed, as with an air mattress, but with chambers separated from one another. The ribs forming at the flexible tube are in the bottom area of the landfill in any orientation, and preferably so that the maximum production length for the tube mat of about 150 m is optimally utilized and laying out with as few seams or overlapping locations as possible. In the embankment area, the orientation is such that the flexible tubes, or the ribs formed later by filling, run in the direction of the slope. They may also be arranged slightly obliquely, but only at an acute angle, to preserve the flowability of the filled-m slurry during the installation of the protective layer.

The filling can be done with a water-sand mixture or with concrete. The water can escape quickly through the geotextile. As a result, according to the invention, dewatering and thus an automatic compression of the filled substance inside the flexible tube occurs already during the filling process. It is essential here to use mats with separate, tube-shaped subdivisions, because due to the relatively small diameter of a single flexible tube in relation to the mat as a whole, the water must cover only small distances until it gets to the geotextile outer skin and can flow away or evaporate there. The tubular shape also means that the filled strand is almost completely surrounded by geotextile tissue, that is, also at the side edges where the connecting lines are formed. Thus, water runs first into a textile-covered outer area, but not directly into an adjacent tube chamber. The rib shape favors drainage of the water at the bottom. With appropriate installation in the direction of the slope, the escaping water can drain into the channels formed below the connecting lines.

Preferably, in the method according to the invention the slurry to be stored in the landfill can be used to complete the protective tube mat. Significant economic benefits are associated with such a hydraulic in-situ filling, since unlike the use of sand, soil or concrete, initially the associated material and transport costs do not apply and also the reduction of capacity due to the up to 30 cm high protective layer is eliminated. Based on the considerable circumferential length of a mining landfill basin, a significant increase in landfill volume is available with the preferred method according to the invention of using the waste slurry to fill the protective tubes, which in turn extends the useful life of the landfill.

Using the waste slurry for filling is completely harmless, since the leak tightness against the bottom is due exclusively to the bottom sealing layers, which includes, for example, a plastic sealing strip. The water-permeable but opaque geotextile fabric of the protective tube mat prevents sediment from being blown by the influence of wind after the slurry has dried, thus potentially transporting toxic substances. Since the water contained in the slurry can escape quickly through the geotextile, according to the invention dewatering takes place already during filling and thus an automatic compression of the filled substance inside the flexible tube.

Thus, a solid and mechanically highly resistant protective layer is formed, which also completely shields the UV radiation and also offers good protection against heat effect on the underlying sealing layer due to its layer thickness. The rib structure created by the separate flexible tubes during filling also leads to the formation of channels on the underside, which in addition to enabling the water drain during the filling and compression phase can later have a ventilation function.

Particularly advantageous is the use of a two-layered woven protective tube mat with the upper and lower layer being interwoven along the connecting lines. This not only creates a particularly high-strength connection, it also does not need an additional seam to be introduced, so that the production time for the protective tube mat is reduced. It is also possible to form sown connecting lines instead of woven connecting lines or, for example, to weave only the edges on the side and then make a split into a plurality of flexible tubes via seams introduced in the middle.

Particularly advantageous in the method according to the invention is that transporting the filler material is possible without vehicles by introducing a pumpable suspension via a hose system in the flexible tubes. For this purpose, the flexible tubes have one or more filling openings, depending on their length. For the protective tube mats to be installed horizontally, the filling openings are arranged in particular in a central region, resulting in a flow direction toward both sides and thus in uniform filling. It is also possible to provide additional filling openings in the respective end areas in the bottom protective tube mats, in order to fill the flexible tubes quickly.

However, in the embankment protective tube mats, the filling opening is preferably provided at the end of the protective tube mat to be arranged on top so that here either a hose nozzle is introduced, and the slurry runs down from there in the tube or that the tube is pushed through the filling opening into the flexible tube and then successively pulled out as the filling level increases.

In one preferred application, the protective tube mat is installed on a bentonite-containing bottom sealing layer. By filling the tubes, on the one hand, water escapes and leads to the swelling of the bentonite. In addition, this also provides a ballast, which prevents rising of the geomembranes and/or uneven swelling of bentonite webs.

A geotextile suitable for carrying out the method is presented in claim 9 and comprises at least one lower and one upper layer, which are connected to each other via at least two parallel connecting lines, so that at least one flexible tube is formed between the connecting lines. Preferably, a subdivision into several flexible tubes takes place. Since the flexible tubes, which are initially lying flat, rise up rib-shaped during filling, a subdivision into a plurality of individual flexible tubes serves, in particular, to reduce the height of the fully filled protective tube mat.

Particularly advantageous is the use of a polypropylene fabric for the production of the protective tube mat, as this results in a high chemical resistance. Another advantage is that the use of a polyolefin offers the possibility of welding by thermal action or by ultrasonic welding.

In addition, a further preferred embodiment of a geotextile protective tube mat according to the invention provides an additional UV protective layer, which is formed from a plastic fiber fleece and is placed on the outwardly facing sun-exposed surface of the protective tube mat. This UV protective layer is at least selectively connected to the multi-layer protective tube mat, so that the installation of the protective tube mat and its UV protective layer can be done in a single operation. The UV protective layer protects the sun-exposed areas, especially at the embankment protective tube mats. A UV protective layer is generally not required in the area of the bottom protective tube mats, provided that the beginning of operation and filling of the landfill basin takes place shortly after installation.

For a full understanding of the present invention, reference should now be made to the following detailed description of the preferred embodiments of the invention as illustrated in the accompanying drawings.

DESCRIPTION OF THE PREFERRED EMBODIMENTS

The preferred embodiments of the present invention will now be described with reference to FIGS. 1-5 of the drawings. Identical elements in the various figures are designated with the same reference numerals.

Figure 1:
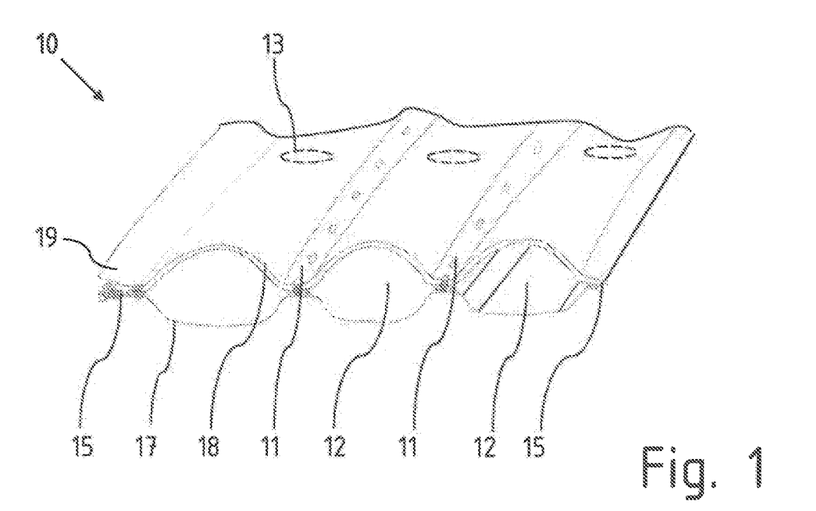
FIG. 1 is a perspective sectional view of a protective tube mat.

FIG. 1 shows a perspective sectional view of a protective tube mat 10 required for carrying out the method according to the invention. It consists of a lower layer 17 and an upper layer 18, which are each formed as a geotextile, wherein the layers 17, 18 are connected to each other, in particular woven together, along parallel connecting lines 15. An additional connecting line 15 exists at the respective outer edges. Additional fasteners, such as zippers, may be provided at the edges to connect adjacent protective tube mats without overlapping. Filling openings 13 serve to fill the flexible tubes 12 between the adjacent connecting lines 11 and between the interconnected layers 17, 18.

An additional UV protective layer 19 is applied to the upper layer 18. It is connected to the underlying fabric layer of the upper layer 18 along the connecting lines 11, 15.

Figure 2:
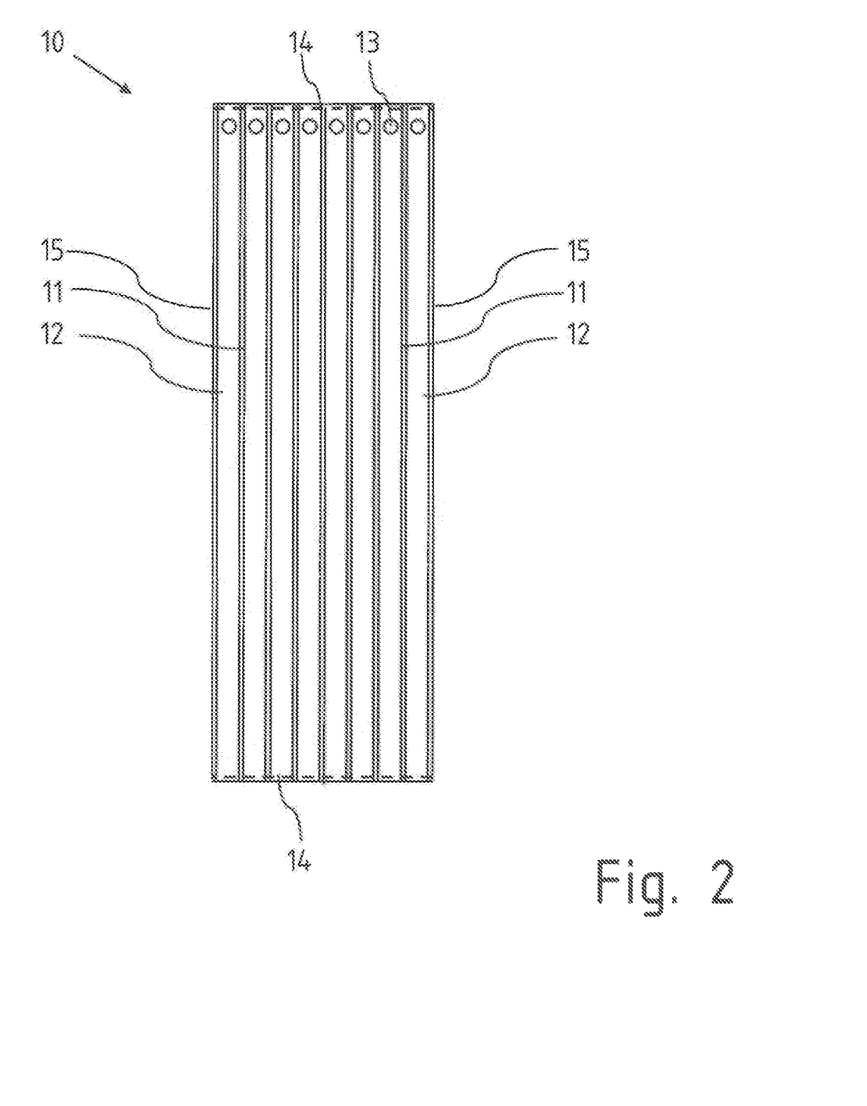
FIG. 2 is a top view of a protective tube mat.

FIG. 2 shows the protective tube mat 10 in the unfilled state from above. The width, and thus the size and number of connecting lines 11 and flexible tubes 12, is limited by production technology and is about 5 m. In the longitudinal direction, however, very large track lengths of up to 100 m and more are possible.

This width, for example, divided so that the flexible tubes 12 in the filled state have a height of about 30 cm-40 cm. Since there is no strong internal pressure during filling, which takes place solely with hydrostatic pressure, an elliptical cross-section results for each flexible tube after filling, which has a width of about 60 cm, for example, at the said height of 30 cm-40 cm. Together with the area required for interweaving, welding, gluing or sewing along the connecting lines 11, 15, the width per flexible tube 12 in the unfilled state is about 70-90 cm, so that over a track width of 5 m, about 5 to 7 flexible tubes 12 can be placed next to each other.

FIG. 2 shows a relatively short protective tube mat 10, which is provided for covering an embankment. Therefore, filling openings 13, which allow access to the flexible tubes 12, are introduced only in an upper end region. The protective tube mat 10 is closed at its respective ends with a transverse seam 14.

Figure 3:
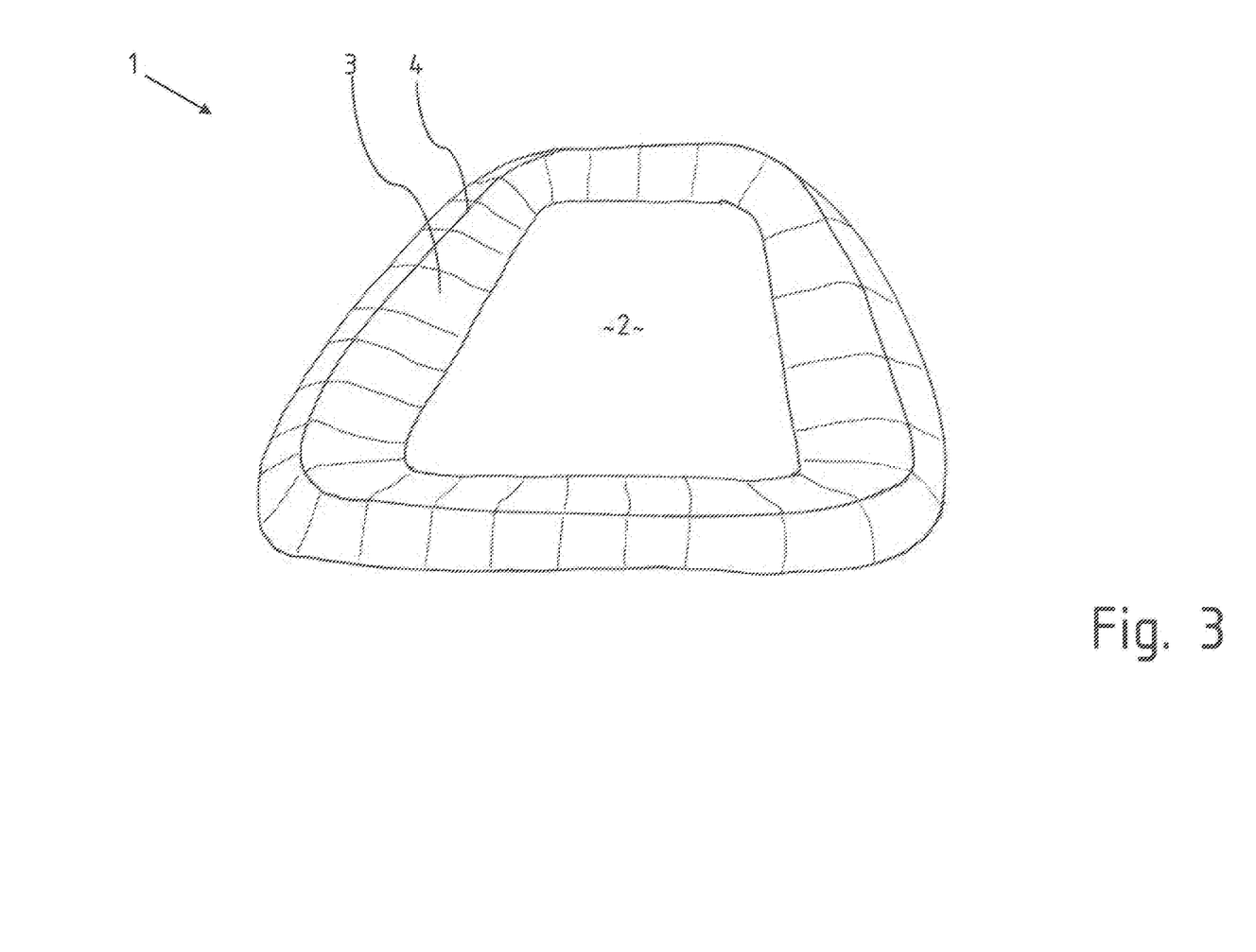
FIG. 3 is a perspective view of an empty landfill basin.

FIG. 3 shows a landfill basin 1 that has a bottom area 2 and an embankment ring 3 surrounding this bottom area 2. The embankment 3 rises to a slope crown 4 and then drops down again toward the outside. The landfill basin 1 is already prepared by flattening the substrate material and by applying a base seal layer.

Figure 4:
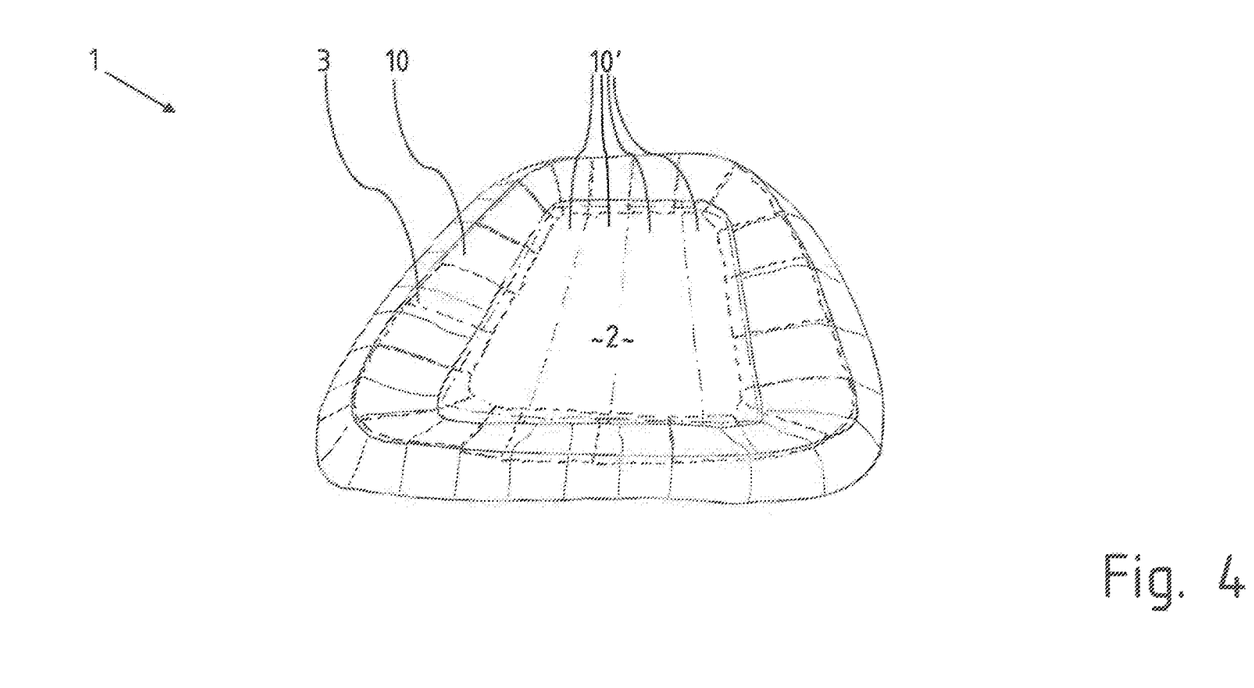
FIG. 4 is a perspective view of an installation plan for a landfill basin.

FIG. 4 shows a possible installation plan for the landfill basin 1. The dashed lines indicate the location of the embankment protective tube mats 10 to be installed later. The dot-dashed lines indicate the position of the bottom protective tube mats 10'. All protective tube mats 10, 10' can be prefabricated to an exact size at the landfill basin 1, so that they fit accurately after placement and mutual bonding on the embankment 3 and on the bottom 2, even in curved areas of the embankment 3.

Figure 5:
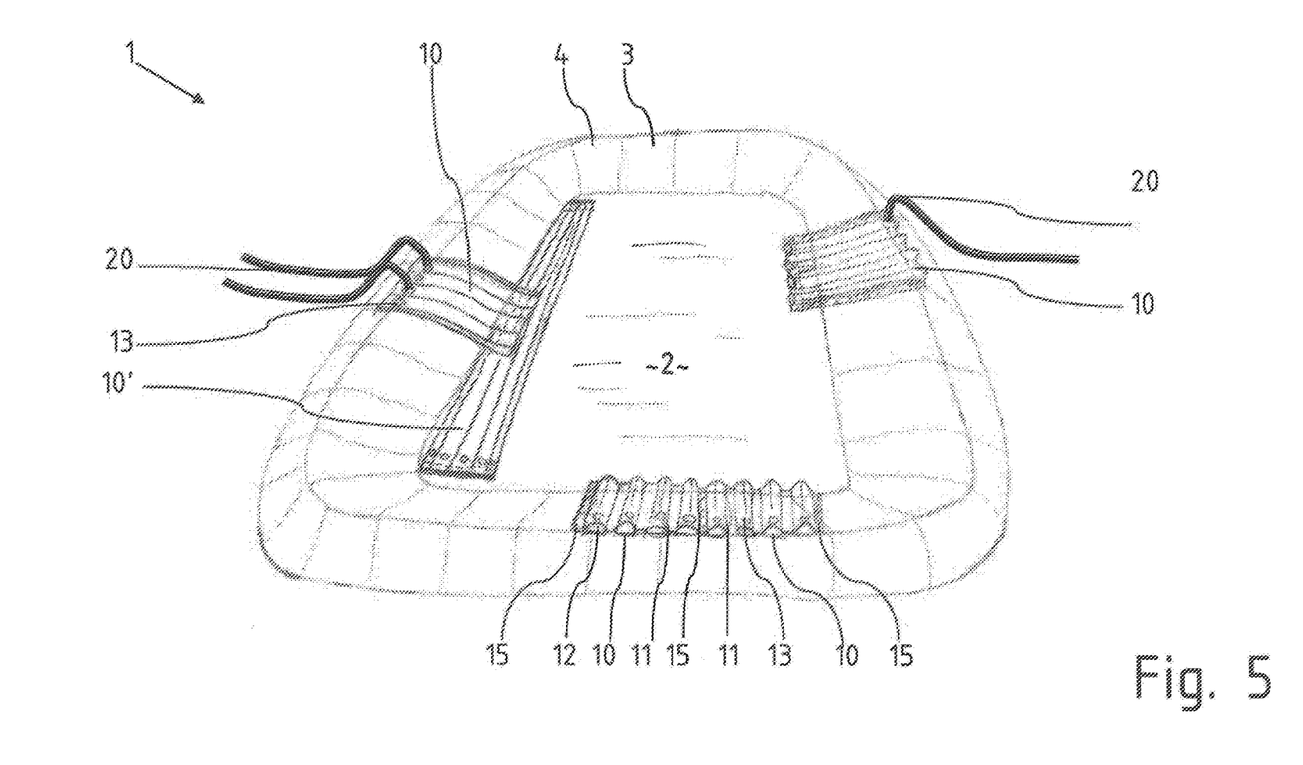
FIG. 5 is a perspective view of a landfill basin with some protective tube mats.

FIG. 5 shows the landfill basin 1 with some exemplary protective tube mats 10, 10'. In the bottom area 2, a bottom protective tube mat 10' is laid out on the left edge, which extends over the entire length of the bottom 2. In the embankment area 3 next to it on the left, an embankment protective tube mat 10 is placed. The embankment mat 10 lies on top in the overlapping area with the bottom mat 10'.

In the embankment tube protective mat 10 left and the other embankment tube protective mat 10 right at the opposite bank, tubes 20 are inserted into the filling openings 13, through which slurry is pumped into the flexible tubes 12.

After pumping, ribs are formed from the flexible tubes 12, which are separated from each other by the connecting lines 11, 15 therebetween. The filling process is already completed at the protective tube mat 10 laying on the front embankment. The filling openings 13 are closed. Due to the three-dimensional shaping of the embankment tube protective mat 10 during filling, transverse contracting takes place, which must be considered in the preparation of the installation plan according to FIG. 4, that is, the web width must first be assumed with an excess corresponding to the width in the unfilled state shown in FIG. 2 and must then reach the intended final dimension after the filling process, so that along the embankment ring 3 and on the bottom 2, a coverage of the underlying sealing layers can be achieved without gaps and also without folds.

There has thus been shown and described a novel method, and a geotextile protection tube mat, which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Method for setting up a protective sealing layer in a landfill basin for industrial and mining slurries,
    wherein the landfill basin comprises at least one bottom area and one embankment ring, which are covered at least to a maximum fill level with a single or multilayer bottom sealing layer,
    said method comprising the steps of:
    a) providing and using bottom protective tube mats consisting of a water-permeable, multi-layered geotextile fabric in which at least one lower layer and one upper layer are directly connected to one another along a plurality of parallel connecting lines wherein, between adjacent connecting lines, whereby separate flexible tubes are formed, each having at least one filling opening;
    b) laying out the bottom protective tube mats on the bottom area of the landfill basin;
    c) laying out embankment protective tube mats on the embankment ring, wherein the flexible tubes are aligned in the direction of the slope of the embankment or at an acute angle thereto; and
    d) filling each flexible tube individually with an aqueous suspension and closing the filling openings.

2. The method as in claim 1, wherein the flexible tubes are filled with the slurry to be deposited in the landfill basin.

3. The method as in claim 1, wherein the protective tube mat is woven in at least two separate layers and in that the lower and upper layer are interwoven along connecting lines.

4. The method as in claim 1, wherein the protective tube mat is formed of at least two layers of a geotextile fabric and in that the two layers are sown together along connecting lines.

5. The method as in claim 1, wherein, below the bottom sealing layer, an additional sealing layer is arranged, which contains a swellable bentonite solid material mixture.

6. The method as in claim 1, wherein the protective tube mats are installed overlapping and wherein during the filling first the flexible tubes of a protective tube mat lying on top are filled and then the flexible tubes of an underlying protective tube mat are filled.

7. The method as in claim 1, wherein the embankment protective tube mats are provided with a filling opening that is arranged in an end region.

8. The method as in claim 1, wherein the bottom protective tube mats are provided with at least one filling opening that is arranged in a central longitudinal region of the flexible tubes.

9. A geotextile protective tube mat for carrying out the method according to claim 1, comprising at least two layers of a water-permeable, multi-layered geotextile fabric, in which at least one lower layer and one upper layer are arranged along a plurality of parallel connecting lines are interconnected, wherein a flexible tube is formed between each of the connecting lines, said flexible tube having at least one filling opening, wherein the flexible tubes are separated from each other and have at least one filling opening each.

10. The geotextile protective tube mat as in claim 9, wherein the geotextile fabric is a polypropylene fabric.

11. The geotextile protective tube mat as in claim 9, wherein a UV protective layer connected at least on one side to the protective tube mat, which is formed from a plastic fiber fleece.

* * * * *